Dec. 12, 1933.    E. D. VANCIL    1,938,786
SPRING OPERATED WIPER
Filed Dec. 1, 1930
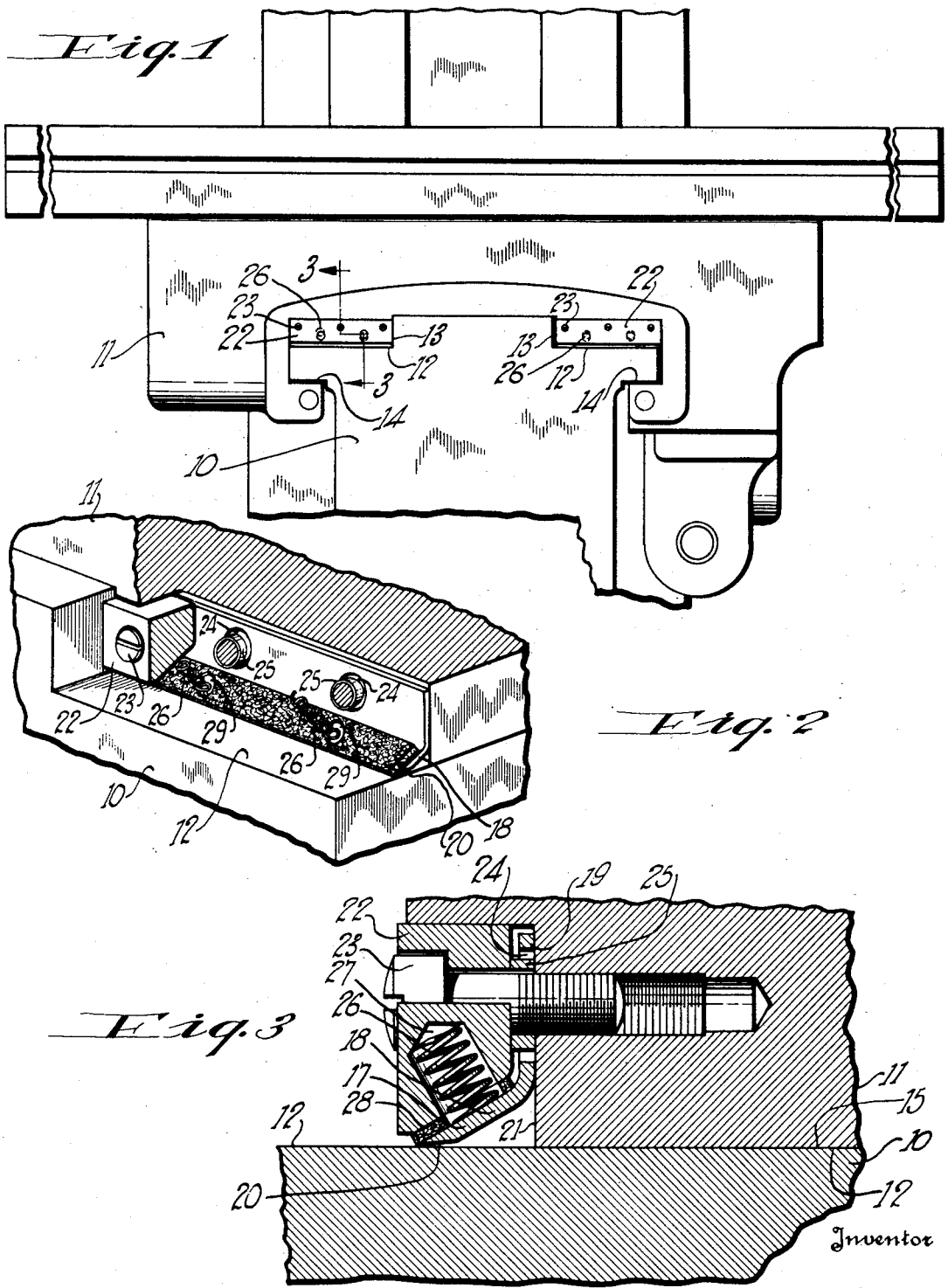
Inventor
EDGAR D. VANCIL
By HK Parsons
Attorney Patented Dec. 12, 1933

1,938,786

UNITED STATES PATENT OFFICE 1,938,786

SPRING OPERATED WIPER

Edgar Donald Vancil, Cincinnati, Ohio, assignor to The Cincinnati Milling Machine Company, Cincinnati, Ohio, a corporation of Ohio Application December 1, 1930. Serial No. 499,239

9 Claims. (Cl. 308—5)

This invention relates to machine tools and more particularly to an improved wiper for the guideways thereof.

In the past, attempts have been made to protect the guideways of machine slides in general, and more particularly of machine tools, by providing means to wipe or clean the guideway in advance of the approaching slide in order to prevent, as far as possible, grit or other foreign material becoming lodged between the guide surfaces of the parts and thus increase their length of surface and maintain their accurate alignment. These attempts have been somewhat unsatisfactory for the reason that thin pieces of metal were used and clamped into place with an initial bend to give them resiliency and for this reason the pieces were under constant tension with the result that the metal finally became fatigued and the wiper lost its effectiveness. Furthermore, it was necessary to accurately align the wiper parallel to the surface of the guideway to insure complete cleaning thereof and since the wiper was permanently fastened to the movable slide it was subject to all the vibrations thereof and when it lost its resiliency would rise or fall minutely with the movable part thereby permitting foreign material to pass under the blade and get between the guide surfaces of the parts.

It is, therefore, one of the objects of this invention to provide a new and improved wiper for the guideways of moving parts which will be maintained in contact with the guide surface throughout the width thereof and under even pressure and which will not depend upon the resiliency of the wiper for its effectiveness.

Another object of this invention is to provide a wiper for the guideways of moving parts which will be self compensating for wear of the cleaning blade thus insuring permanent contact with the guide surface without the necessity for adjustment.

A further object of this invention is to provide an improved means for wiping the guide surfaces of moving machine parts that will be independent of the vibrations of the movable part thus insuring a positive acting wiper.

A still further object of this invention is to provide a wiper with means for absorbing excess lubricant as it moves forward on the guideway under the impulse of the moving machine part and which will dispense the oil on the guideway during its return movement.

Other objects and advantages of the present invention should be readily apparent by reference to the following specification considered in conjunction with the accompanying drawing illustrative of one embodiment thereof, but it will be understood that any modifications may be made in the specific structural details hereinafter disclosed, within the scope of the appended claims, without departing from or exceeding the spirit of the invention.

Referring to the drawing in which like reference numerals indicate like parts,

Figure 1 is an elevation of a machine tool showing the application of this invention to one of the movable parts thereof.

Figure 2 is a perspective view, partially broken away, showing one embodiment of the invention.

Figure 3 is a section on the line 3—3 of Figure 1.

For the purpose of illustration, the invention has been shown in connection with a machine tool in which the reference numeral 10 indicates a support having slidably mounted thereon the saddle 11 and for this purpose the latter is provided with bearing surfaces 12—12 and guide surfaces 13—13 and 14—14. The saddle or other slidable member is provided with a bearing surface 15 complementary to the bearing surface 12 and it is for the purpose of preventing foreign material, that may be on the surface 12 in advance of the approaching member, from finding its way in between the surfaces 12 and 15 that the wiper, indicated generally by the reference numeral 16, has been provided.

The wiper comprises the wiper plate 17, which may be made of any suitable material and of a length equal to the width of the bearing surface to be cleaned. The plate is bent throughout its length to an obtuse angle forming a blade portion 18 and a bearing portion 19. The blade portion 18 is provided with a beveled edge 20 for contacting the bearing surface 12. The wiper plate is so positioned that the bearing portion 19 rests against the face 21 of the member 11 which is normal to the bearing surface 12 and in this position the angle is such that the edge 20 will scrape along the surface 12 without the heel of the bevel contacting with the surface. A guard plate 22 is secured to the slide 11 by suitable means, such as the fillister head screws 23. It is desirable, however, that the wiper plate have a floating connection with the member 11 in order to be free from the vibrations thereof, as well as self compensating for wear. The plate 17 is accordingly provided with a plurality of apertures 24 which are sufficiently large to receive spacer blocks 25 interposed between the guard plate 22 and the member 11 to thereby space the guard plate from the member a distance slightly greater than the thickness of the wiper plate. Since the apertures 24 are larger in diameter than the spacers 25 it permits the guard plate to be securely clamped to the member 11 without interfering with the free movement of the plate 17.

The edge 20 of the plate is constantly pressed against the surface 12 by a plurality of springs 26 spaced longitudinally of the wiper and housed in bores 27 of the guard plate normal to the surface of the blade portion 18. The pressure of the spring will cause movement of the bearing portion 19 substantially parallel to the surface 21 thereby insuring that the edge 20 is in contact with the surface 12 and also aligned parallel therewith.

From the foregoing it should now be apparent that a wiper has been provided in which the blade is mounted in such a manner as to be free from vibrations of the moving member 11 while still being constantly pressed against the surface 12 throughout the width thereof and under even pressure. It will be noted that the pressure is provided by a plurality of suitable independent springs thereby eliminating dependence on the resiliency of the wiper plate for the necessary pressure. It should also be apparent that, due to the floating condition of the wiper plate, it will automatically readjust itself as the edge 20 wears away.

It is necessary that a certain amount of lubricant be maintained between the bearing surfaces to eliminate friction and the tendency would be for the wiper blade to reduce this oil film to a minimum by carrying it to one end of the bearing surface during a period of constant reciprocation of the member 11. To obviate this, as well as provide means for lubricating the edge 20 a piece of absorbent material of a braided nature, such as felt, is interposed between the blade 18 and the beveled surface 28 of the guard plate. The felt is provided with apertures 29 to permit the springs to directly contact the blade 18. During advance of the slide 11 the felt or other absorbent material will absorb the excess oil that is pushed up in front of the blade and during return will dispense the oil due to the squeezing action between the blade 18 and the beveled surface 28 resulting from the slight shift forward of the plate 17 when the slide returns and drags the plate after it. Upon reverse movement the plate 17 will then shift slightly backward allowing the felt to expand and be in a condition to again absorb excess oil.

From the foregoing it should now be apparent that a new and improved wiper has been provided for the guide surfaces of moving machine parts which is self-lubricating, self-adjustable for wear and self-aligning and one that can be maintained in contact with the surface under any and all circumstances and at any desirable pressure.

Attention is invited to the fact that the wiper blade may pass beyond the end of the guideway without causing any damage, due to the fact that the stiffness of the wiper plate is sufficient to prevent undue bending thereof by the spring while unsupported by the guideway.

That which is claimed is:

1. In a device of the class described, a wiper for the bearing guideway of a slidable member, said wiper having a blade portion mounted at an angle to said guideway and a supporting portion contacting said member, resilient means normal to the blade portion for urging the edge thereof into contact with the guideway, and means carried by the member for supporting said resilient means.

2. A wiper for the guide surface of a slidable member including a guard member mounted in spaced relation to a face of said slidable member, a wiper plate floatingly mounted between the members, said plate having a blade portion disposed at an angle to the guide surface, and means carried by the guard to maintain the edge of said blade in contact with the surface.

3. A wiper for the guide surface of a slidable member including a guard member, spacers between the guard member and the slidable member, means extending through the spacers to secure the members together, a wiper plate having apertures therein for loosely receiving said spacers, said plate having a blade portion, and resilient means carried by the guard and acting normal to the blade portion for maintaining a wiping contact with the guide surface during all movements of the slidable member.

4. A wiper for a machine tool slide reciprocably mounted on a bearing guide member, comprising a guard block secured in spaced relation to the face of said slide, a wiper plate floatingly mounted in said space, said plate having an angular blade portion, the side of which is beveled forming a scraping edge contacting said guide, absorbent material interposed between the blade and the block adjacent the edge thereof, whereby upon movement in one direction, lubricant will be absorbed from said surface and upon movement in the other direction lubricant will be dispensed to said surface.

5. A wiper for the guideway of a machine tool slide comprising a plate floatingly connected to a forward face of the slide, a guard therefor secured in spaced relation to said face, the plate having a blade portion angularly related to said guide-way to effect wiping thereof, said guard having an angular face parallel to the blade, and means inserted between the plate and the block to effect lubrication of the blade.

6. A wiper for a guideway of a movable machine part comprising a wiper blade extending transversely of said guideway and supported thereby, a floating connection between the blade and said movable part, and resilient means supported by the movable part and movable independently of the part for constantly urging the blade into contact with the guideway whereby the full length of the blade will be maintained in contact with the guideway irrespective of any separating movement between the part and its guideway.

7. In a device of the class described, a wiper for the bearing guideway of a slidable support, said wiper having a blade portion mounted at an angle to said guideway, and a second portion contacting said support, resilient means operative on the blade portion for urging an edge thereof into contact with the guideway for wiping the same, and means carried by the member for supporting said resilient means.

8. In a device of the class described, a wiper for the bearing guideway of a slidable support, said wiper having a blade portion mounted at an angle to said guideway, and a second portion contacting said member, resilient means operative on the wiper intermediate said portion for urging the blade into contact with the guideway, and means carried by the support for supporting said resilient means.

9. In a device of the class described, a wiper for a bearing guideway of a slidable support, said wiper having a blade portion mounted at an angle to said guideway and a second portion contacting said member, said wiper having a plurality of enlarged openings formed therein between said portions, a plurality of members projecting from said suport and passing respectively through said openings, and a plurality of resilient members supported by the projecting members for urging said blade portion into contact with the guideway.

EDGAR DONALD VANCIL.